United States Patent [19]
Siegel

[11] 3,821,592
[45] June 28, 1974

[54] VERTICAL DEFLECTION CIRCUIT FOR A COLOR TELEVISION CAMERA HAVING DIFFERENT RASTER SIZES IN ITS CHANNELS

[75] Inventor: Emil Siegel, Darmstadt-Arheilgen, Germany

[73] Assignee: Robert Bosch Fernsehanlagen GmbH, Darmstadt, Germany

[22] Filed: Mar. 9, 1973

[21] Appl. No.: 339,534

[30] Foreign Application Priority Data
Mar. 11, 1972 Germany........................... 2211867

[52] U.S. Cl........................... 315/13 C, 178/5.4 M
[51] Int. Cl......................................... H01j 29/50
[58] Field of Search......... 178/5.4 M, 5.43 T, 5.4 R; 315/276 D, 27 R, 13 C, 13 R

[56] References Cited
UNITED STATES PATENTS

| | | | |
|---|---|---|---|
| 3,305,750 | 2/1967 | Schneider | 178/5.4 M |
| 3,609,219 | 9/1971 | Diehl | 178/5.4 M |

*Primary Examiner*—Richard A. Farley
*Assistant Examiner*—J. M. Potenza
*Attorney, Agent, or Firm*—Littlepage, Quaintance, Murphy & Dobyns

[57] ABSTRACT

An improvement in the deflection circuit of a color television camera with a plurality of pick-up tubes of different raster sizes, where difficulties arise from the necessity of correcting geometric errors, bringing the rasters into electrical registration and stabilizing this registration against temperature fluctuations. A single vertical deflection generator supplies each of the pick-up tubes, and operational amplifiers fed by this deflection generator are connected to sets of deflection coils. The amplification factors of each amplifier are adjusted by measurement resistors of different size corresponding to the size of the raster, but of equal temperature coefficient. Other single function generators in parallel to the deflection generator may be connected to the operational amplifiers by way of potentiometers.

9 Claims, 1 Drawing Figure

PATENTED JUN 28 1974
3,821,592
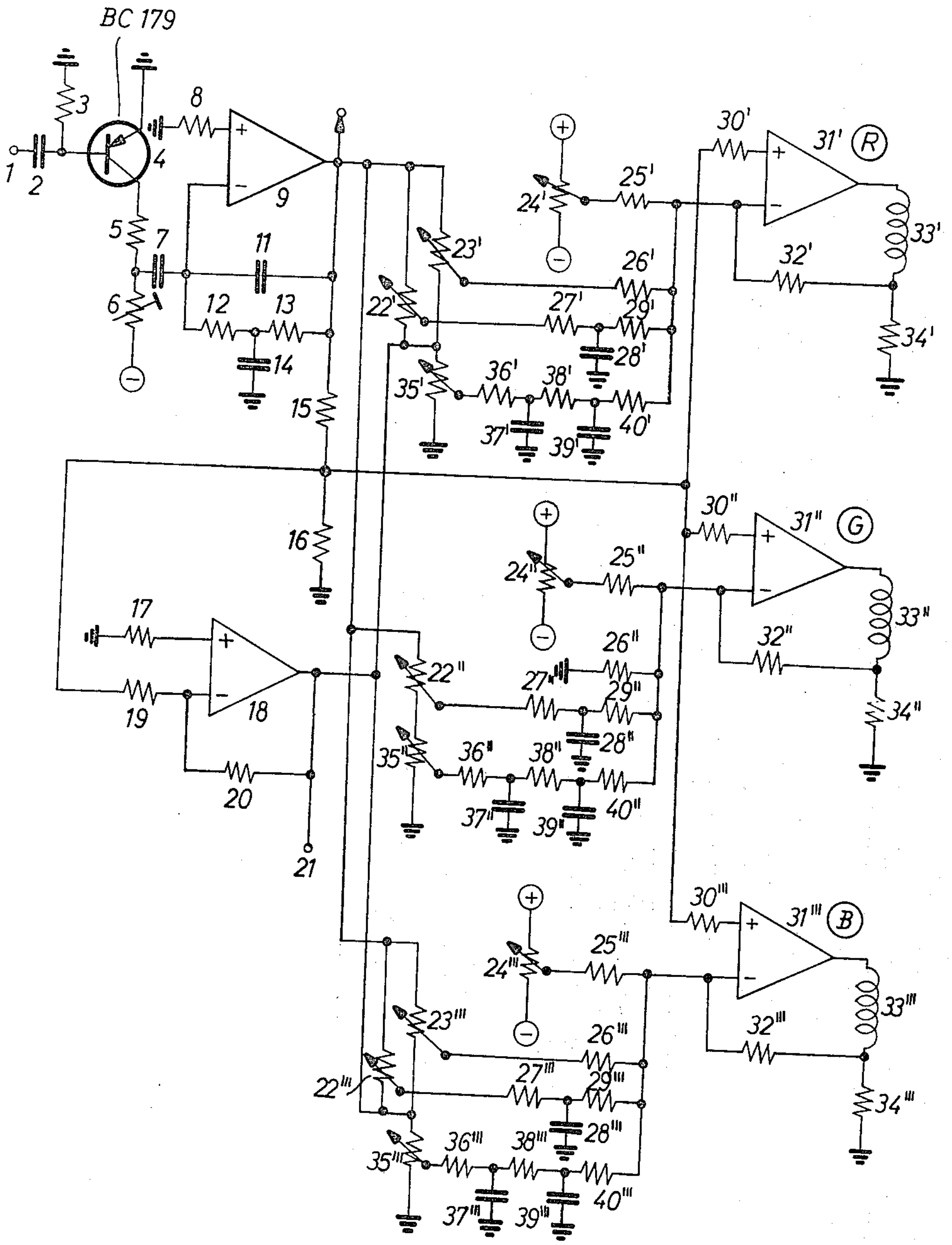

VERTICAL DEFLECTION CIRCUIT FOR A COLOR TELEVISION CAMERA HAVING DIFFERENT RASTER SIZES IN ITS CHANNELS

BACKGROUND OF THE INVENTION

The invention relates to color television cameras with a plurality of pick-up tubes, and more specifically to a color camera with different scanning raster sizes in the pick-up tubes. The invention is particularly adapted to be used in the vertical deflection circuit of a color camera of this kind. In a color camera with three pick-up tubes, an optical multiplexing system is provided for projecting one of three monochrome picture representations onto the light sensitive cathodes of the pick-up tubes. These three monochrome picture representations generate signal currents of different amplitude, so that at equal raster size, a different lag results therefrom. As this different lag appears on the screen of the reproducing picture tube in form of a colored flag, a very disturbing effect is resulting. To avoid this disturbance, a mode of operation of the camera tubes has been chosen in which the three tubes are driven with nearby the same signal current per square millimeter of raster surface.

As the light flux on the photo-cathodes of the three pick-up tubes cannot be increased, the condition of equal signal current has been realized by using smaller and different raster surfaces. In consequence thereof, the field strength in the deflection coils of the three pick-up tubes must be of different intensity. If, as usual in vertical deflection circuits, the three vertical deflection coils of the tubes are connected in series, new difficulties result. If the number of windings in the separate deflection systems is different, then the production conditions are very inconvenient.

Another way of overcoming the difficulties consists in shunting the deflection coils with different-sized resistors. Here a problem arises in maintaining the intended current distribution in spite of the different temperature coefficients of the copper of the coils and the material of the resistors.

In the disclosed embodiment of the invention, the above-mentioned difficulties in the vertical deflection system of a color camera with different raster sizes are overcome by connecting one end of each of the vertical deflection coils of the pick-up tubes which are to be driven with different deflection currents to the output of operational amplifiers with essentially equal amplifying properties. Thus, one input of the amplifier is connected to the output of a common sawtooth generator, the inverting other input being connected by way of a feedback resistor to the junction of a measuring resistor and the other end of the deflection coils. Each of the measuring resistors has an equal temperature coefficient, but has an ohmic value proportional to the necessary deflection amplitudes.

In this manner it is possible to fulfil the extremely high demands of stability for the three amplifier channels and to conveniently adjust the size, position and geometry of the scanning rasters relative to each other.

A correct registration of the scanning rasters and of the optical picture frame may be effected by additionally connecting voltage function generators to the inverting inputs of the amplifiers. For instance, the inverting inputs of the amplifiers may be connected by resistors having an ohmic value which is a multiple of the values of the feedback resistors to a constant source of controllable voltage and polarity, and additionally to a sawtooth voltage source and a parabolic voltage source. Due to the inverting amplification in the operational amplifiers, antiphase voltages result on the measuring resistors, so that errors of position or geometry can be compensated. Again, the quality of the measuring resistors of equal temperature coefficients allows for stability under changing temperature conditions.

It is known per se to use operational amplifiers, e.g., in form of integrated circuits, in deflection generators. Nevertheless, the problem of stable alignment of the scanning patterns of different size in color television cameras could not be solved satisfactorily until now.

Other advantages and aspects of the invention will be explained in connection with the appending drawing showing an example of a deflection circuit according to the invention.

The vertical deflection unit for color television cameras as shown in the drawing comprises five operational amplifiers, 9, 18, 31′, 31″ and 31‴. The first of them, amplifier 9, is connected as sawtooth generator circuit, the second, amplifier 18, as an inverting stage and the three others as regular amplifiers.

The sawtooth generator comprising the operational amplifier 9 is connected in a known manner as an integrating amplifier. For this purpose, the positive input is connected to ground by way of a resistor 8. The inverting input and the output are connected by an integrating network consisting of integrating capacitor 11 and RC-network 12, 13, 14. The inverting input is controlled by a vertical synchronizing voltage pulse from a terminal 1 by way of a capacitor 2 and a transistor 4 with a base shunting resistor 3. The pulse voltage is derived from the voltage divider 5 and 6 of the collector circuit. Resistor 6 is controllable, so that the sawtooth amplitude can be coarsely adjusted.

The sawtooth voltage of linear character at the output of the operational amplifier 9 is connected on the one hand by way of a voltage divider 15 and 16 and the resistors 30′, 30″, 30‴ to the positive inputs of respective operational amplifiers 31′, 31″, 31‴. The sawtooth voltage is also connected to the ends of the potentiometers 22′, 22″, 22‴. The other ends of these potentiometers are fed by the inverted sawtooth voltage from the output of the amplifier 18. The inverting input of this amplifier 18 obtains its input voltage from a resistor 16 by way of an input resistor 19. A feedback resistor 20 is shunted between output and inverting input of amplifier 18. According to a further aspect of the invention, it is possible to derive antiphased sawtooth voltages from the outputs of the amplifiers 9 and 18, so that by feeding the horizontal deflection coils with these voltages, that disturbance of the raster usually called skew (rotation of the picture due to incorrect angles between the horizontal and vertical deflection coils) may be compensated.

A sawtooth voltage with an amplitude which is alterable from zero voltage in both directions can be derived from the taps of the potentiometers 22′, 22″, 22‴. The same is true for the voltages on the taps of potentiometers 23. Before explaining the function of these potentiometers in detail, some remarks shall be made about the function of the operational amplifiers 31 which feed the deflection coils 33.

The three systems serve for the vertical movement of the cathode rays in the pickup tubes for the "red", "blue" and "green" color channels. A very high stability is required for the amplifiers, as a deviation of 1 part per thousand of the sawtooth amplitude results in a visible registration error of the rasters. Therefore, the means for correcting the registration errors should be high-ohmic voltage sources, based upon voltages of as high voltage as is possible so that the temperature coefficients have no effect. In the introduction it was explained that the values of the measuring resistors determine the amplitude of the sawtooth currents. Therefore, the temperature coefficients should be practically identical. Then, provided that the loop amplification is essentially lower than the maximal amplification and the resistance of the controlling sources is sufficiently high-ohmic, the three amplifiers are practically independet of temperature variations. Resistors of this kind are commercially available.

In FIG. 1 three sets of potentiometers 22, 23, 24 serving for the adjustment of the registration are shown. An adjustment of the zero position (center) of the rasters may be achieved by means of the potentiometers 24', 24'', 24''', the ends of each of which are connected to opposite direct voltages, by which the three centers respectively may be brought into registration. With the potentiometers 23', 23'' and, 23''', the sawtooth amplitudes of the "red" amplifier and the "blue" amplifier may be equalized to the amplitude of the "green" amplifier, while the absolute size of the rasters can be adjusted by means of the potentiometer 6.

Finally the potentiometers 22', 22'', 22''' may be used for the compensation of nonlinearities. From the RC-networks 27, 28, and 29, a parabolic deviation from the sawtooth form obtained from the tap of the potentiometers 22 may be achieved. The number of potentiometers can be reduced if the linearity adjustment of the green channel is chosen as a relative constant for the "red" and "blue" channels. In this case the potentiometer 22'' and the deformation network 27'', 28'', 29'' may be omitted.

An individual tangent adjustment can be effected too. In FIG. 1, it is supposed that the blue raster in its dimensions is so much different from the red and green rasters that a separate adjustment of the tangent distortion must be applied. For this purpose a sawtooth voltage from the tap 35 is twice integrated by the network 36''', 37''', 38''', 39'''. By adjustment of the position of the tap 35''', the necessary amplitude of this form results. This voltage is introduced into the blue amplifier 31''' by way of resistor 40'''.

I claim:

1. A vertical deflection circuit for a color television camera having a plurality of pickup tubes having scanning rasters of different sizes, each pickup tube having a separate vertical deflection coil, comprising:

A. a corresponding plurality of operational amplifiers, each such operational amplifier having its output connected to one end of its respectively corresponding vertical deflection coil, each amplifier having a positive input terminal and an inverting input terminal, B. a corresponding plurality of measuring resistors, each measuring resistor being connected at one end to a source of constant potential and connected at its other end to the other end of its respectively corresponding vertical deflection coil to form a measurement junction, all measuring resistors having the same temperature coefficients, C. a corresponding plurality of feedback resistors respectively associated with the operational amplifiers, each feedback resistor being connected between the respectively corresponding measurement junction and the inverting input terminal of the respectively corresponding operational amplifier, and D. a main generator of sawtooth current connected to the positive input terminal of each operational amplifier.

2. A circuit according to claim 1 further comprising:

A. a corresponding plurality of direct voltage sources of controllable voltage and polarity, and B. a corresponding plurality of input resistors having ohmic values which are multiples of the corresponding feedback resistors for connecting the voltage sources to the inverting inputs of the respectively corresponding operational amplifiers.

3. A circuit according to claim 1 further comprising:

A. a source of sawtooth signals of controllable amplitude and polarity, and

B. resistor means having ohmic values which are multiples of the ohmic values of the feedback resistors for connecting the sawtooth signal source to the inverting inputs of the operational amplifiers.

4. A circuit according to claim 3, wherein the inverting inputs of the operational amplifiers are additionally connected to parabolic voltage sources consisting of integrating circuits fed with sawtooth voltages from said main sawtooth generator.

5. A circuit according to claim 4, the inverting inputs of the operational amplifiers are additionally connected to tangent error correcting circuits of controllable voltage and polarity which are fed with sawtooth voltages and which contain a double-integration circuit.

6. A vertical deflection circuit according to claim 3 wherein the sawtooth signals of controllable amplitude and polarity are obtained from an output of a further operational amplifier, the inverting input of which being connected to the output of the main sawtooth generator.

7. In vertical deflection circuit for a color television camera having a plurality of pickup tubes with separate control of the scanning raster size of each pickup tube, each pickup tube having a separate deflection coil and comprising:

A. a corresponding plurality of amplifiers, each amplifier having its output connected to one end of the corresponding deflection coil, each amplifier having a positive input terminal and an inverting input terminal, B. a corresponding plurality of measuring resistors, each measuring resistor being connected between a source of constant potential and the other end of the corresponding deflection coil, and C. means for supplying sawtooth current to the positive input terminal of each amplifier the improvement wherein the amplifiers are operational amplifiers and further comprising:

D. a corresponding plurality of feedback resistors connected at one end to junctions between corresponding deflection coils and measuring resistors and connected at their other ends to the inverting input terminals of the corresponding operational amplifiers to provide a feedback signal for adjusting the amplification of each of the operational amplifiers.

8. A circuit according to claim 7 further comprising means for connecting the inverting input terminals of the respective amplifiers to a corresponding source of d.c. voltage of controllable magnitude and polarity, to a corresponding source of sawtooth signals of controllable amplitude and polarity, and to a corresponding source of parabolic voltage in the form of an integrated sawtooth voltage.

9. A circuit according to claim 8 further comprising means for connecting the inverting inputs of the respective amplifiers to a corresponding source of tangent-error correcting voltage in the form of a double-integrated sawtooth voltage.

* * * * *